G. E. LUCKEY.
CORN-HUSKERS AND SHELLERS.

No. 184,535. Patented Nov. 21, 1876.

WITNESSES:
Francis McArdle.
John Goethals.

INVENTOR:
G. E. Luckey
BY
ATTORNEYS.

UNITED STATES PATENT OFFICE.

GEORGE E. LUCKEY, OF PARIS, TENNESSEE.

IMPROVEMENT IN CORN HUSKERS AND SHELLERS.

Specification forming part of Letters Patent No. 184,535, dated November 21, 1876; application filed July 11, 1876.

*To all whom it may concern:*

Figure 1:
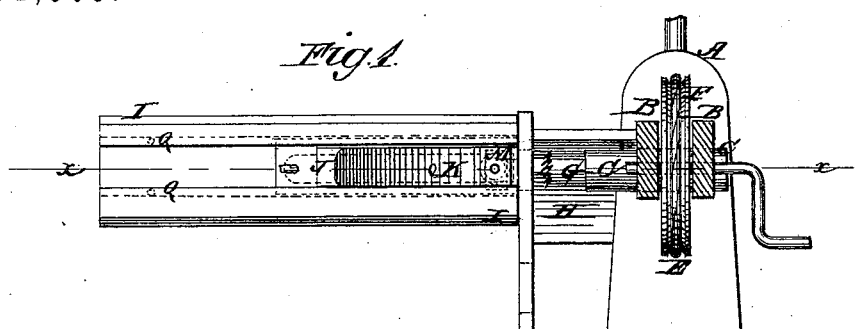
Figure 3:
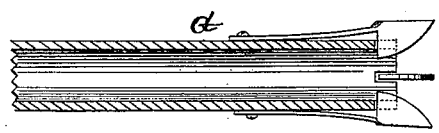
Figure 4:
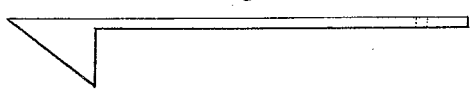
Figure 2:
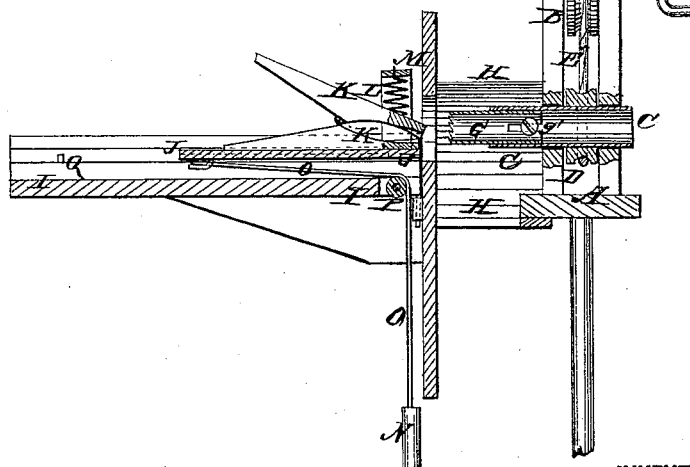

Be it known that I, GEORGE E. LUCKEY, of Paris, county of Henry and State of Tennessee, have invented a new and Improved Corn Husker and Sheller, of which the following is a specification:

Figure 1 is a top view of my improved machine, the upper part of the upright frame being cut away. Fig. 2 is a vertical cross-section of the same, taken through the line *x x*, Fig. 1. Fig. 3 is a detail longitudinal section of the cutter and its cylinder. Fig. 4 is a detail view of a sheller-tooth.

The object of this invention is to furnish an improved machine for husking and shelling corn, which shall be simple in construction, inexpensive in manufacture, not liable to get out of order, and effective in operation, doing its work rapidly and well.

The invention will first be described in connection with drawing, and then pointed out in the claim.

Similar letters of reference indicate corresponding parts.

A is a bench of convenient length, breadth, and height. To the forward part of the bench A are attached two uprights, B, in bearings in the lower part of which revolves a cylinder, C. To the cylinder C, between the uprights B, is attached, or upon it is formed, a pulley, D, around which passes a band, E. The band E also passes around a large pulley, F, pivoted to and between the upper parts of the uprights B, and to the journal of which power is applied by a crank, a treadle, or other convenient means. The pulleys D F and band E may be replaced by equivalent gear-wheels, if desired. In the forward end of the cylinder or holder C is inserted a cylindrical cutter, G, the inner part of which is slotted longitudinally to receive the set-screw *g'*, by which it is secured in place in said cylinder C.

The forward edge of the cutter G is serrated, which teeth may be made finer when intended for husking alone, and coarser when intended for shelling alone. One, two, three, or more of the said cylinders may be pivoted to the uprights B, and driven by the same train of gearing.

As the corn is separated from the cob it drops into the box H attached to the bench A, and from the bottom of which it flows into some suitable receiver. The sides and forward end of the box H project above the cutter G, to prevent the corn from scattering about. In the end of the box H, directly opposite each cutter G, is formed a hole, through which the ears of corn are passed into the said cutter, which hole is made larger than an ear of corn.

To the shelling-cylinder G, about three inches from its outer end, are attached the spring-shanks of four teeth, which are made with a square shoulder, and an inclined forward end, as shown in Fig. 4. The points of the teeth project through slots in the said cylinder, so as to come in contact with the corn, whether operating upon a large or a small ear, the inner points of the teeth being from five-eighths to three-fourths of an inch apart.

To the outer side of the end of the box H is attached a table, I, by means of lugs and keepers or other suitable device, and in the upper side of which is formed a T-groove, to receive a slide, J. To the slide J is attached a clamp, K, the jaws of which are held shut by a spiral spring, L, the lower end of which rests upon the upper jaw of the said clamp, and its upper end rests against the bend of a loop, M, attached to the slide J in such a position as to strike against the end of the box H and stop the slide J, when the forward end of the clamp K has entered the hole in the said end of the box H sufficiently far to allow all the corn to be removed from the cob by the cutter G. The slide J and its attachments are fed forward by the weight N attached to the lower end of a leather strap, O, which passes over a small roller, P, pivoted in a notch in the forward end of the table I, and its upper end is attached to the under side of the rear end of the slide J, the upper side of the table I being grooved to receive the said strap. The upper part of the weight N is made hollow, to receive loose weights, so that it may be regulated according to the power required to feed the ears forward to the cutters.

In using the machine, the butt of the ear is presented to the husking-cutter, which removes the husks, and shells about an inch of the ear. The ear is then withdrawn, reversed, secured in the clamp K, and fed forward to the shelling-cutter, by which the rest of the corn is removed from the cob. The outward movement of the slide J is limited by stop-pins Q attached to the table I, and which enter grooves in the said slide J, which grooves extend from its outer end nearly to its inner end.

Having thus described my invention, I claim as new and desire to secure by Letters Patent—

The combination, with rotary cylinder C, of a longitudinally-slotted cutter-tube, G, serrated on its forward edge and provided with spring-shanked teeth, having a square shoulder and inclined front, the points of said teeth projecting through slots of said tube, as and for the purpose specified.

GEORGE ELLERY LUCKEY.

Witnesses:
WM. ROGERS,
JAS. M. WILKINS.